(No Model.)
S. W. DECKER.
CULTIVATOR.
No. 438,989. Patented Oct. 21, 1890.
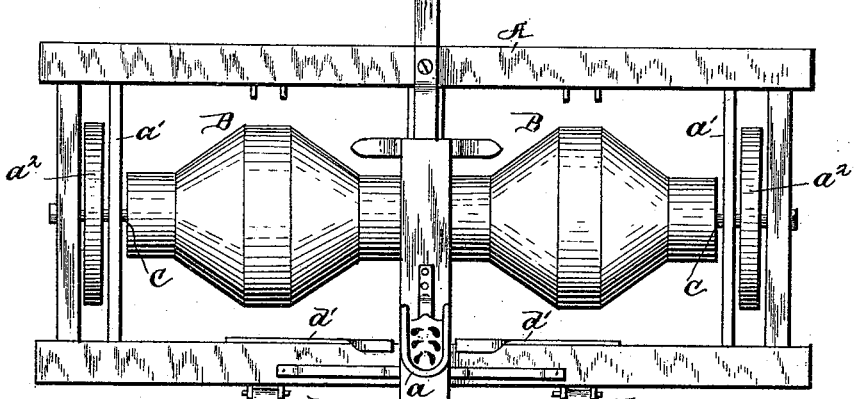
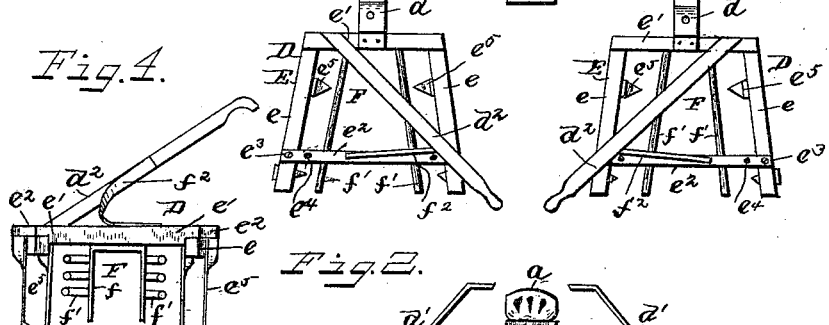
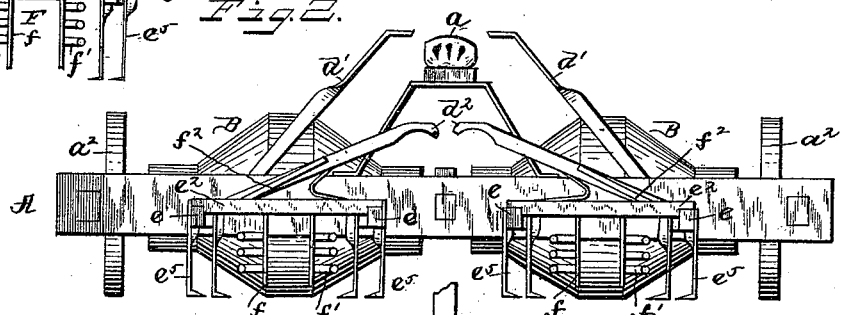
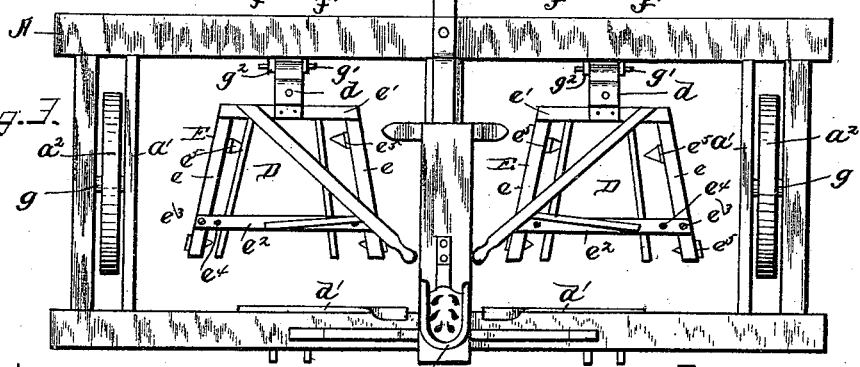
Witnesses
Wm. S. Hodges
Robert Jennings
Inventor
Samuel W. Decker
By Allan Rutherford
Attorney
THE NORRIS PETERS CO., PHOTO-LITHO., WASHINGTON, D. C.

UNITED STATES PATENT OFFICE.

SAMUEL W. DECKER, OF VERDON, NEBRASKA.

CULTIVATOR.

SPECIFICATION forming part of Letters Patent No. 438,989, dated October 21, 1890.

Application filed August 2, 1890. Serial No. 360,789. (No model.)

*To all whom it may concern:*

Be it known that I, SAMUEL W. DECKER, a citizen of the United States of America, residing at Verdon, in the county of Richardson and State of Nebraska, have invented certain new and useful Improvements in Cultivators, of which the following is a specification, reference being had therein to the accompanying drawings.

This invention pertains to a new and improved roller and cultivator for cultivating listed corn; and it comprises the detailed construction, combination, and arrangement of parts, substantially as hereinafter fully set forth, and particularly pointed out in the claims.

In the accompanying drawings, Figure 1 is a top plan view illustrating my invention. Fig. 2 is a rear end view. Fig. 3 is a view similar to Fig. 1, with the roller removed and showing the cultivating attachments substituted therefor. Fig. 4 is a front end view of one of said attachments.

Referring to the drawings, A designates the frame, $a$ a seat secured thereon, and $a'$ inner cross-pieces parallel with the ends, between which and said ends carrying-wheels $a^2$ are located.

B B designate rollers or drums located in frame A and secured by a longitudinal rod C, which also serves as a journal for the wheels $a^2$. These rollers or drums are preferably made of wood, and their thickest point is in the center.

D D designate the cultivating attachments, which are connected at their forward ends by universal joints $d$ to the rear bar of frame A, whereby they can be swung in any position, and when not in use held up out of the way by vertical arms $d'$, secured to frame A, the handles $d^2$ of each attachment being designed to engage therewith for this purpose. Each cultivating attachment comprises a frame E, having two side bars $e$ and front and rear cross-bars $e'$ $e^2$, the latter being adjustable by screws $e^3$, passed through holes or apertures $e^4$ thereof. To the side bars $e$ are secured knives $e^5$, the lower ends of which are bent inwardly and inclined, as shown. Between these side knives is located a fender F, which consists of an inverted-U-shaped bar $f$, having a series of rearwardly-extending rods $f'$ diverging toward their rear ends. The bar $f$ is connected to the under side of cross-bar $e'$. The handles $d^2$ are secured at their lower forward ends to bar $e'$, and are supported by brace-bars $f^2$, secured to bar $e^2$.

The advantages of my invention as thus constructed will be apparent. The rollers or drums break clods in advance of the cultivating-knives and level the ground in their passage, and this is of great advantage in cultivating both list and ridge corn, obtaining uniformity and preventing the ground from washing away.

When it is desired to use my invention without the rollers or drums, the central rod C and the rollers or drums are removed and the wheels $a^2$ are secured in place by short journal-rods $g$, and the cultivating attachments are placed within frame A, their universal joints being secured by pins $g'$ to eyes or staples $g^2$ on the inner side of the front bar of frame A. When thus arranged, the device is converted into a riding cultivator, and can likewise be employed when the rollers or drums are used and the cultivating attachments omitted or held elevated by the vertical arms of the main frame.

I claim as my invention—

1. The combination, with the frame having rollers, of the cultivating attachment secured to said frame, consisting of the frame having side bars and front and rear cross-bars, the latter being adjustable, the knives secured to said side bars, having lower inwardly-bent inclined ends, and the central fender comprising an inverted-U-shaped bar and a series of rearwardly-extended divergent rods, substantially as set forth.

2. The herein-described improved cultivator, consisting of the main frame having a seat secured thereto and vertical arms, the carrying-wheels, the rollers or drums secured in said frame, the central rod upon which said wheels and drums are journaled, the cultivating-attachment frames, the universal joints connecting the latter to said main frame, the knives, the central fenders having rearwardly-extend convergent rods, and the handle-bars designed to engage said vertical arms, substantially as set forth.

In testimony whereof I affix my signature in presence of two witnesses.

SAMUEL W. DECKER.

Witnesses:
JOHN W. CLARK,
R. N. COX.